United States Patent
Kowalkowski et al.

(10) Patent No.: US 8,910,466 B2
(45) Date of Patent: Dec. 16, 2014

(54) EXHAUST AFTERTREATMENT SYSTEM WITH DIAGNOSTIC DELAY

(75) Inventors: Janean E. Kowalkowski, Northville, MI (US); Stephen Paul Levijoki, Swartz Creek, MI (US); James M. Perrin, Livonia, MI (US); John Coppola, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 13/467,513

(22) Filed: May 9, 2012

(65) Prior Publication Data
US 2013/0298527 A1 Nov. 14, 2013

(51) Int. Cl.
*F01N 3/00* (2006.01)

(52) U.S. Cl.
USPC .................. 60/276; 60/274; 60/295

(58) Field of Classification Search
CPC ................ F01N 3/023; F01N 13/008
USPC ........... 60/274, 276, 277, 295, 297, 301, 311; 73/1.02, 1.06, 23.31–23.33, 114.69, 73/114.71–114.73, 28.01; 701/29.7–31.3
See application file for complete search history.

(56) References Cited

U.S. PATENT DOCUMENTS

| | | | | |
|---|---|---|---|---|
| 5,157,919 A * | 10/1992 | Gopp | ............................... | 60/274 |
| 5,865,026 A * | 2/1999 | Davey et al. | ..................... | 60/274 |
| 5,894,727 A * | 4/1999 | Zimlich | ........................... | 60/274 |
| 5,974,786 A * | 11/1999 | Kluzner et al. | .................. | 60/274 |
| 6,018,944 A * | 2/2000 | Davey et al. | ..................... | 60/274 |
| 6,112,518 A * | 9/2000 | Jerger et al. | ..................... | 60/274 |
| 6,195,986 B1 * | 3/2001 | Davey et al. | ..................... | 60/274 |
| 6,397,583 B1 * | 6/2002 | Davey et al. | ..................... | 60/277 |
| 7,347,086 B2 | 3/2008 | Webb et al. | | |
| 2007/0256406 A1 * | 11/2007 | Makki et al. | .................... | 60/277 |
| 2008/0295815 A1 * | 12/2008 | Clever | .......................... | 123/680 |
| 2009/0158715 A1 * | 6/2009 | Stroh et al. | ...................... | 60/295 |
| 2009/0272099 A1 | 11/2009 | Garimella et al. | | |

(Continued)

FOREIGN PATENT DOCUMENTS

AT 501503 A1 9/2006

OTHER PUBLICATIONS

C. Schenk, C. Laroo; NOx Adsorber Aging on a Heavy-Duty On-Highway Diesel Engine—Part One. Society of Automotive Engineers, Inc; 2003 (2003-1-0042).

*Primary Examiner* — Thomas Denion
*Assistant Examiner* — Mickey France
(74) *Attorney, Agent, or Firm* — Quinn Law Group, PLLC

(57) ABSTRACT

An apparatus and method of controlling a vehicle aftertreatment system is provided. The aftertreatment system treats exhaust gas produced by the vehicle engine and includes a particulate filter, and a NOx reducing device such as a selective catalytic reduction (SCR) device. The particulate filter is configured to regenerate to remove accumulated particles when the exhaust gas is heated above a regeneration temperature. A diagnostic device is included for monitoring the aftertreatment system. The diagnostic device may be a sensor for measuring the oxides of nitrogen (NOx) and/or an SCR efficiency monitor. A controller is employed to optimize the function of the diagnostic device. The controller does not enable the diagnostic device when the vehicle is powered until one or more entry conditions are satisfied.

14 Claims, 1 Drawing Sheet

(56) References Cited

U.S. PATENT DOCUMENTS

| | | |
|---|---|---|
| 2010/0043397 A1 | 2/2010 | Wang et al. |
| 2010/0180576 A1 | 7/2010 | Wang et al. |
| 2011/0023456 A1 | 2/2011 | Levijoki et al. |
| 2011/0219747 A1* | 9/2011 | Geveci et al. .................. 60/274 |
| 2011/0252767 A1* | 10/2011 | Lin et al. ........................ 60/274 |
| 2011/0296905 A1* | 12/2011 | Bastoreala et al. ........ 73/114.75 |
| 2012/0060476 A1* | 3/2012 | Pfister ............................ 60/274 |
| 2012/0125081 A1* | 5/2012 | Yadav et al. ................. 73/23.33 |

\* cited by examiner

EXHAUST AFTERTREATMENT SYSTEM WITH DIAGNOSTIC DELAY

TECHNICAL FIELD

The present invention relates to a method and apparatus for controlling an aftertreatment system in a vehicle.

BACKGROUND

Internal combustion engines produce a number of emissions, including various oxides of nitrogen, referred to collectively herein as NOx gases. NOx gases are created when nitrogen and oxygen molecules present in engine intake air are exposed to high temperatures of combustion. Exhaust aftertreatment systems are used in vehicles in order to reduce and manage the NOx gases created in the combustion process. To aid this process, aftertreatment systems employ a variety of diagnostic devices.

SUMMARY

An apparatus and method of controlling a vehicle aftertreatment system is provided. The aftertreatment system treats exhaust gas produced by the vehicle engine. The aftertreatment system includes a selective catalytic reduction (SCR) device and a particulate filter. The particulate filter is configured to regenerate to remove accumulated particles when the exhaust gas is heated above a regeneration temperature. The aftertreatment system includes at least one diagnostic device for monitoring the functioning of the aftertreatment system. The diagnostic device may be a NOx sensor positioned upstream and/or downstream of the SCR device. The diagnostic device may be a selective catalytic reduction efficiency monitor.

A controller is employed to optimize the function of the diagnostic device. The controller delays the enablement of the diagnostic device until one or more entry conditions are met. The entry condition may be whether a predefined amount of time at a predefined temperature has elapsed or whether a predefined number of particulate filter regenerations have occurred. Delaying the enablement of the diagnostic device allows diagnostic monitoring of the aftertreatment system to take place when a catalyst in the SCR device has reached a minimum level of efficiency. A method is also provided for controlling operation of an aftertreatment system in a vehicle producing exhaust gas.

The above features and advantages and other features and advantages of the present invention are readily apparent from the following detailed description of the best modes for carrying out the invention when taken in connection with the accompanying drawings.

DESCRIPTION

Figure 1:
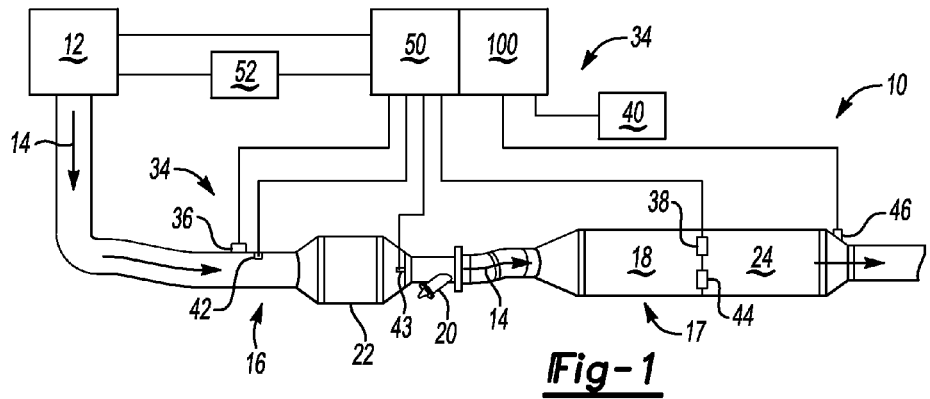
FIG. 1 is a schematic illustration of a vehicle having an aftertreatment system and a controller which uses an algorithm as set forth herein.

Referring to the drawings, wherein like reference numbers correspond to like or similar components throughout the several figures, a portion of a vehicle 10 is shown in FIG. 1 having an engine 12 producing an exhaust gas 14. The vehicle 10 includes an aftertreatment system 16 for treating constituents in the exhaust gas 14 such as oxides of nitrogen (NOx). Referring to FIG. 1, the aftertreatment system 16 includes a NOx absorbing or NOx reducing device 17, such as a selective catalytic reduction (SCR) device 18 (illustrated in FIGS. 1-2). Alternatively, the NOx reducing device 17 may be a NOx adsorber such as a lean NOx trap (not shown). Any type of device that reduces NOx may be employed.

The SCR device 18 is aimed at reducing oxides of nitrogen (NOx) in the exhaust gas 14 by conversion to nitrogen and water vapor. The SCR device 18 uses a reductant capable of reacting with NOx in combination with excess oxygen. An injector 20 may be used to inject the reductant into the aftertreatment system 16. The reductant may be urea, ammonia, an ammonia precursors or any other suitable material. In one example, the reductant is diesel exhaust fluid (DEF). The NOx reduction reaction takes place as the exhaust gas 14 passes through the SCR device 18. In one example, the engine 12 is a diesel engine. However, the disclosure is applicable to any type of engine with a NOx reducing device 17.

Referring to FIG. 1, the aftertreatment system 16 may include an oxidation catalyst 22. A particulate filter 24 is located downstream from the oxidation catalyst 22 and SCR device 18. Exhaust gas 14 from the engine 12 passes through the oxidation catalyst 22, followed by the selective catalytic reduction device 18 and is then filtered by the particulate filter 24. The oxidation catalyst 22 converts the NO (nitrogen monoxide) gas which is not easily treated in an SCR device 18 into $NO_2$, which is easily treated in the SCR device 18. The oxidation catalyst 22 also eliminates some sulphur derivatives and other compounds from the exhaust gas 14 by oxidizing them to other compounds. As the oxidation catalyst 22 oxidizes the hydrocarbon emissions in the exhaust gas 14, heat is released due to the exothermic nature of the reactions. This heat is used to complete the regeneration of the particulate filter 24.

Figure 2:
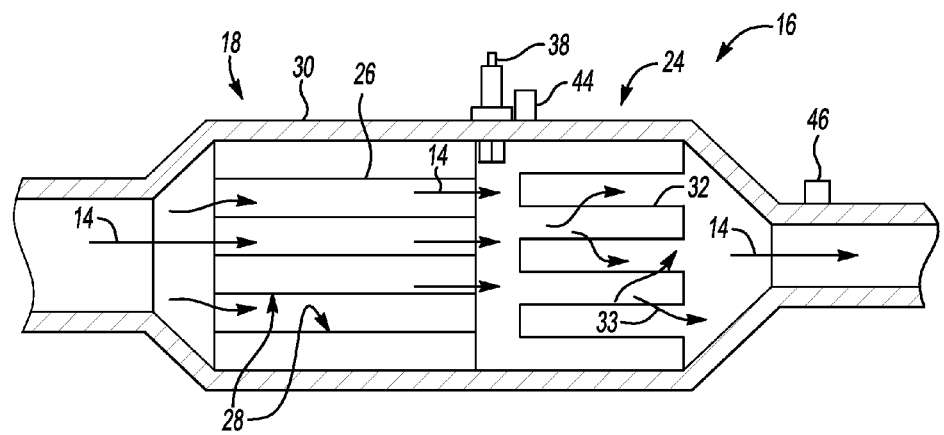
FIG. 2 is a schematic sectional view of a portion of the aftertreatment system shown in FIG. 1, showing the selective catalytic reduction (SCR) device and particulate filter.

FIG. 2 is a schematic sectional view of a portion of the aftertreatment system 16, showing the SCR device 18 and particulate filter 24 in detail. Referring to FIG. 2, the SCR device 18 includes a carrier or substrate 26 that is dipped into a washcoat containing an active catalytic component or catalyst 28. In other words, the catalyst 28 is coated onto the substrate 26. The substrate 26 is configured to increase the surface area available for coating of the catalyst 28. In one example, the substrate 26 is a ceramic honey-comb like block. The substrate 26 may also be composed of metal or any other suitable material. The catalyst 28 may be an oxide of a base metal such as vanadium, molybdenum, tungsten and zeolite. In one example, the catalyst 28 is an iron- or copper-exchanged zeolite. The substrate 26 may be supported with a metallic or mineral 'mat' (not shown) and then packaged into a container 30. In one example, the container 30 is a stainless steel can. Any type of catalyst 28 or substrate 26 may be employed in the SCR device 18.

Referring to FIGS. 1-2, the particulate filter 24 is used to filter out particles or particulate matter produced by the engine 12. These particles may include soot, hydrocarbons, ashes and sulphuric acid. Referring to FIG. 2, the particulate filter 24 may include wall flow filters or channels 32 which are one-ended. The exhaust gas 14 is forced to travel through the porous walls of the channels 32, as shown by arrow 33, leaving particles filtered on the walls of the channels 32. The channels 32 may be composed of ceramic or any other suitable materials.

On regular intervals, the particulate filter 24 has to be regenerated in order to remove the accumulated particles. The particulate filter 24 may be regenerated by being heated above a regeneration or combustion temperature, thereby allowing the particles to combust or burn. In one example, the regeneration temperature is between 600-750° C. The elevated temperature during the regeneration process carries over to the exhaust gas 14 and catalyst 28 in the SCR device 18. Any suitable method of performing regeneration may be employed, including but not limited to, using a fuel burner, using resistive heating coils and using microwave energy.

Referring to FIG. 1, the aftertreatment system 16 includes one or more diagnostic devices 34 adapted for monitoring the aftertreatment system 16. Referring to FIG. 1, the diagnostic devices 34 may be a first and second NOx sensor 36, 38 and/or an SCR efficiency monitor 40. The first and second NOx sensors 36, 38 are configured to determine the amount of NOx in the exhaust gas 14 at their respective locations. Referring to FIG. 1, first NOx sensor 36 may be positioned upstream of the SCR device 18. Referring to FIGS. 1-2, the second NOx sensor 38 may be positioned downstream of the SCR device 18.

Referring to FIG. 1, the diagnostic device 34 may be an SCR efficiency monitor 40. The SCR efficiency monitor 40 may evaluate the NOx conversion efficiency of the SCR device 18 by comparing the NOx content entering the aftertreatment system 16 and the NOx content exiting the aftertreatment system 16. The SCR efficiency monitor 40 may receive input from engine sensors, such as the first and second NOx sensors 36, 38. The SCR efficiency monitor 40 stores mathematical data and calibrated tables to evaluate the performance of the SCR device 18.

The aftertreatment system 16 includes one or more temperature sensors at various locations for sensing the temperature of the exhaust gas 14. Referring to FIG. 1, a first temperature sensor 42 is located at the engine outlet or upstream of the oxidation catalyst 22. A second temperature sensor 43 is located downstream of the oxidation catalyst 22. A third temperature sensor 44 is located downstream of the SCR device 18 or upstream of the particulate filter 24. A fourth temperature sensor 46 is located downstream of the particulate filter 24. The system 16 may also include pressure sensors (not shown).

Referring to FIG. 1, a controller 50 is operatively connected to the engine 12, diagnostic devices 34 and temperature sensors 42, 43, 44, 46 and other components of the vehicle 10. The controller 50 may be the engine control module (ECM) of the vehicle 10 or a separate controller linked to the ECM. Controller 50 is adapted to optimize the function of the diagnostic devices 34 for the vehicle 10. When the vehicle 10 is not powered or is at a beginning of an engine cycle, the diagnostic devices 34 are not enabled. The controller 50 delays the enablement of the diagnostic devices 34 until one or more entry conditions are met.

Delaying the enablement of the diagnostic devices 34 allows diagnostic monitoring of the aftertreatment system 16 to take place when the catalyst 28 has reached a minimum level of efficiency. The efficiency of a catalyst 28 may be improved by the aging process, defined here as exposure for a specific amount of time to a sufficiently high temperature. For example, a catalyst 28 experiencing 45 minutes above 550 Celsius may perform more efficiently than an unexposed or new catalyst 28. This elevated temperature may happen during the regeneration process of the particulate filter 24 described above. This is because the elevated temperature of the particulate filter 24 carries over to the exhaust gas 14 and to the catalyst 28 in the SCR device 18. The efficiency may be improving over the first regeneration event because copper present in the SCR device 18 (where the catalyst 28 includes copper) moves to active sites therefore allowing the SCR device 18 to be more efficient after the regeneration event.

Controller 50 delays the enablement of the diagnostic devices 34 by executing an algorithm 100 which resides within the controller 50 or is otherwise readily executable by the controller 50. Execution of algorithm 100 is described below with reference to FIG. 3.

Algorithm 100 may begin with step 102, where the controller 50 of FIG. 1 determines whether one or more predefined operating parameters are met. The predefined operating parameters may include whether the engine rpm is above a specific value. In one example, the operating parameter may be met when the engine rpm is above 600. One of the operating parameters may be whether the average reading of the temperature sensors is within a specified range. In one example, the operating parameter may be met when the average of the temperature sensors 43, 44 (corresponding to the sensors placed at the inputs and outputs of the SCR device 18, respectively) is between approximately 250 C and approximately 300 C.

Another operating parameter may be whether the flow rate of the exhaust gas 14 through the aftertreatment system 16 is within a specified range. The flow rate of the exhaust gas 14 may be calculated by the controller 50 based on a measured intake mass air flow obtained from a mass air flow sensor 52 operatively connected to the controller 50, shown in FIG. 1. The mass air flow sensor 52 may be operatively connected to an intake air stream of the engine 12. In one example, the operating parameter may be met when the flow rate of the exhaust gas 14 is between approximately 250 kg/hour and approximately 550 kg/hour.

Another operating parameter may be whether a threshold NOx concentration exists, as detected by the first NOx sensor 36 (see FIG. 1) positioned upstream of the SCR device 18. In one example, the operating parameter may be met when the minimum NOx concentration is approximately 175 parts per million (ppm). Another operating parameter may be whether an optimal reductant load on the catalyst 28 (shown in FIG. 2) is met. As is known to those skilled in the art, the catalyst 28 has the ability to store some of the injected reductant or compounds formed by the reductant, such as ammonia formed from the injection of aqueous urea. In one example, the operating parameter may be met when an ammonia load on the catalyst 28 is between approximately 0.3 and approximately 0.4 grams per liter at a temperature of 300 C.

Another operating parameter may be whether one or more built-in system delays are met. In one example, the operating parameter may be met when a 300 second delay has elapsed after the engine 12 is started. Additionally, the operating parameter may be met when a 60 second delay has elapsed after each NOx sensor 36, 38 becomes active and/or a 350 second delay has elapsed after the dosing is turned on or injector 20 is activated.

When one or more of the above operating parameters are met, algorithm 100 then proceeds to step 104. Various combinations of the operating parameters listed above may be employed in a particular system. In one embodiment, each of the above operating parameters must be met.

Figure 3:
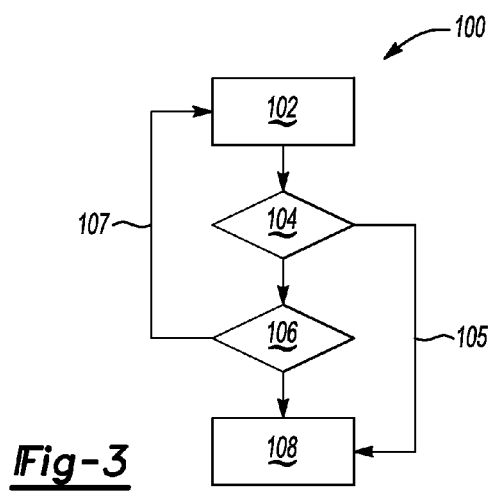
FIG. 3 is a schematic flow diagram for an algorithm or method for controlling the aftertreatment system shown in FIG. 1, in accordance with the present disclosure.

Referring to FIG. 3, at step 104, the controller 50 determines whether a first entry condition is satisfied. The first entry condition may be whether a predefined amount of time t at a predefined temperature T has elapsed for the exhaust gas 14. The controller 50 may determine this using raw or modeled data obtained by one or a combination of the first, second, third and fourth temperature sensors 42, 43, 44, 46. In one example, the first entry condition is whether 30 minutes have elapsed at an excess of 550 Celsius based on the temperature reading of the third temperature sensor 44. In another example, the first entry condition is whether the mathematical average of the readings of the first, second, third and fourth temperature sensors 42, 43, 44, 46 has been above 500 Celsius for more than 45 minutes.

If the first entry condition is satisfied, the algorithm 100 proceeds to step 108, as shown by line 105. Referring to FIG. 3, at step 108, controller 50 enables the operation of the diagnostic devices 34. If the first entry condition is not satisfied, the algorithm 100 proceeds to step 106.

Referring to FIG. 3, at step 106, the controller 50 determines whether a second entry condition is satisfied. The second entry condition may be whether a predefined number of particulate filter regenerations have occurred, described above with respect to the particulate filter 24 in FIGS. 1-2. In one example, the predefined number of particulate filter regenerations is one, i.e., the second entry condition is satisfied when one occurrence of particulate filter regeneration takes place. The controller 50 may determine the number of particulate filter regenerations by counting down data from one or more of the temperature sensor 42, 43, 44, 46. For example, the controller 50 may determine the total number of times the exhaust gas 14 has remained at 500 Celsius for 1560 seconds, through data from the third and fourth temperature sensors 44, 46. If the second entry condition is satisfied, the algorithm 100 proceeds to step 108 at which point the controller 50 enables the operation of the diagnostic devices 34. If the second entry condition is not satisfied, the algorithm 100 proceeds back to step 102, as shown by line 107.

In summary, controller 50 does not enable the diagnostic devices 34 when the engine is started or vehicle is powered until at least one entry condition is satisfied, and then enables the diagnostic devices 34. It is within the scope of the present disclosure that the controller 50 employed may eliminate one or more steps or entry conditions or may determine the steps in an order other than as described above. For example, step 102 may be omitted, with the algorithm 100 beginning at step 104.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
an engine producing an exhaust gas;
an aftertreatment system for treating the exhaust gas, and including a particulate filter;
wherein the particulate filter is configured to regenerate when the exhaust gas is heated above a regeneration temperature;
at least one NOx sensor operatively connected to the aftertreatment system and adapted to determine an amount of NOx in the exhaust gas;
at least one temperature sensor for sensing a temperature of the exhaust gas;
a controller operatively connected to the NOx sensor;
wherein the controller is configured to determine whether a predefined number of particulate filter regenerations has occurred;
wherein the controller does not enable the NOx sensor when the engine is started until one or more entry conditions are each satisfied; and
wherein the one or more entry conditions include a first entry condition, the first entry condition being satisfied when the predefined number of particulate filter regenerations has occurred.

2. The vehicle of claim 1, wherein:
the NOx sensor is positioned upstream of the SCR device.

3. The vehicle of claim 1, wherein:
NOx sensor is positioned downstream of the SCR device.

4. The vehicle of claim 1, wherein:
the controller is configured to determine whether a predefined amount of time at a predefined temperature has elapsed; and
the one or more entry conditions include a second entry condition, the second entry condition being satisfied when the predefined amount of time at the predefined temperature has elapsed.

5. The vehicle of claim 4, wherein the predefined amount of time is 30 minutes and the predefined temperature is 550 Celsius.

6. The vehicle of claim 1, wherein the predefined number of particulate filter regenerations is one.

7. A vehicle comprising:
an engine producing an exhaust gas;
an aftertreatment system for treating the exhaust gas, and including a selective catalytic reduction (SCR) device and a particulate filter;
wherein the particulate filter is configured to regenerate when the exhaust gas is heated above a regeneration temperature;
at least one NOx sensor operatively connected to the aftertreatment system and adapted to determine an amount of NOx in the exhaust gas;
a temperature sensor for sensing a temperature of the exhaust gas;
a controller operatively connected to the NOx sensor;
wherein the controller is configured to determine whether a predefined amount of time at a predefined temperature has elapsed and whether a predefined number of particulate filter regenerations has occurred;
wherein the controller does not enable the NOx sensor when the engine is started until at least one predefined operating parameter is met and one or more entry conditions are each satisfied; and
wherein the one or more entry conditions include a first entry condition, the first entry condition being satisfied when the predefined number of particulate filter regenerations has occurred.

8. The vehicle of claim 7, wherein the predefined operating parameter is met when an engine rpm is above a predefined value; and a temperature reading of the temperature sensor is within a predefined range.

9. The vehicle of claim 7, wherein the predefined operating parameter is met when:
a flow rate of the exhaust gas through the aftertreatment system is within a predefined range; and
a reductant load on a catalyst in the SCR device is within an optimal range.

10. The vehicle of claim 7, wherein the one or more entry conditions include a second entry condition, the second entry condition being satisfied when the predefined amount of time at the predefined temperature has elapsed.

11. The vehicle of claim 7, wherein the NOx sensor is positioned upstream of the SCR device.

12. The vehicle of claim 7, wherein the NOx sensor is positioned downstream of the SCR device.

13. A method for controlling operation of an aftertreatment system in a vehicle having an engine producing exhaust gas, the method comprising:
- providing a selective catalytic reduction (SCR) device and a particulate filter in the aftertreatment system;
- providing at least one NOx sensor for the aftertreatment system, the NOx sensor configured to determine an amount of NOx in the exhaust gas;
- disabling the NOx sensor when the engine is started;
- heating the exhaust gas in order to regenerate the particulate filter;
- sensing a temperature of the exhaust gas;
- determining whether a predefined amount of time at a predefined temperature for the exhaust gas has elapsed and whether a predefined number of particulate filter regenerations has occurred;
- enabling the NOx sensor when at least one predefined operating parameter is met and one or more entry conditions are each satisfied;
- wherein the one or more entry conditions include a first entry condition and a second entry condition; and
- wherein the first entry condition is satisfied when the predefined amount of time at the predefined temperature has elapsed and the second entry condition is satisfied when the predefined number of particulate filter regenerations has occurred.

14. The method of claim 13, wherein the NOx sensor is positioned upstream of the SCR device.

\* \* \* \* \*